United States Patent

Craycroft et al.

Patent Number: 5,838,315
Date of Patent: Nov. 17, 1998

[54] SUPPORT FOR CUSTOM USER-INTERACTION ELEMENTS IN A GRAPHICAL, EVENT-DRIVEN COMPUTER SYSTEM

[75] Inventors: Timothy J. Craycroft; Robert R. Ulrich, both of Mountain View, Calif.

[73] Assignee: Apple Computer, Inc., Cupertino, Calif.

[21] Appl. No.: 977,059

[22] Filed: Nov. 24, 1997

Related U.S. Application Data

[63] Continuation of Ser. No. 593,171, Feb. 1, 1996, Pat. No. 5,692,142.

[51] Int. Cl.$^6$ .................................................. G06F 3/14
[52] U.S. Cl. ........................................... 345/333; 345/326
[58] Field of Search .................................... 345/326–334, 345/339–342, 348, 352

[56] References Cited

U.S. PATENT DOCUMENTS

| | | | |
|---|---|---|---|
| 5,140,677 | 8/1992 | Fleming et al. ...................... | 345/348 |
| 5,140,678 | 8/1992 | Torres ................................... | 345/333 |
| 5,339,392 | 8/1994 | Risberg et al. ...................... | 345/333 |
| 5,388,202 | 2/1995 | Squires et al. ...................... | 345/334 |
| 5,428,729 | 6/1995 | Chang et al. ........................ | 345/331 |
| 5,544,288 | 8/1996 | Morgan et al. ..................... | 345/342 |
| 5,546,520 | 8/1996 | Cline et al. .......................... | 345/342 |
| 5,581,670 | 12/1996 | Bier et al. ............................ | 345/326 |
| 5,598,524 | 1/1997 | Johnston, Jr. et al. ............. | 345/348 |
| 5,696,915 | 12/1997 | Johnston, Jr. et al. ............. | 345/335 |
| 5,754,178 | 5/1998 | Johnston, Jr. et al. ............. | 345/343 |

OTHER PUBLICATIONS

Burge, Thomas E. et al., "Advanced OS/2, Presentation Manager Programming", John Wiley & Sons, Inc., 293–308 1993.

*Primary Examiner*—Thomas G. Black
*Assistant Examiner*—Ruay Lian Ho
*Attorney, Agent, or Firm*—Burns, Doane, Swecker & Mathis, L.L.P.

[57] ABSTRACT

Explicit support for custom gadgets is provided, at a system software level, in a manner that is essentially application-transparent. Specific support is provided for the addition of one custom gadget per window. The custom gadget is identified by a specific numeric code in the same manner as the close and zoom boxes. An application simply tells the system software what the custom gadget for a particular window should look like. The code responsible for drawing that window's frame then knows where to find the image of the custom gadget and will render it appropriately. When a user clicks in the custom gadget, the system software notifies the application of the event by means of the numeric code associated with the custom gadget. More particularly, in accordance with one embodiment of the invention, a custom interactive user-interface element is provided in a title bar of a window of an application program in a graphical, event-driven computer system having a computer display. The custom interactive user-interface element is provided by storing information, referring to an icon stored as part of said application program and used to visually represent the custom interactive user-interface element, in a location accessible to a Window Manager. The Window Manager then draws on the computer display a frame of the window including the icon used to visually represent the custom interactive user-interface element.

17 Claims, 1 Drawing Sheet

SUPPORT FOR CUSTOM USER-INTERACTION ELEMENTS IN A GRAPHICAL, EVENT-DRIVEN COMPUTER SYSTEM

This application is a continuation of application Ser. No. 08/593,171, filed Feb. 1, 1996, now U.S. Pat. No. 5,692,142.

BACKGROUND OF THE INVENTION

1. Field of the Invention

The present invention relates to graphical, event-driven computer systems, more particularly to custom interactive user-interaction elements in a computer system having a window-based graphical user interface.

2. State of the Art

A large amount of effort has been devoted to improving the ease of using computer systems. One area where this is especially evident is that of computer user interfaces. For example, the use of windows, icons and pulldown, pop-up, or tear-off menus greatly enhances the ease of using a computer system. One computer system which makes extensive use of windows is the Macintosh computer system manufactured by Apple Computer, Inc. In the Macintosh computer, a window is a desktop object that displays information such as a document or a message. Windows can be any size, shape or color, and there can be one or many of them depending on the application.

The part of the window that the application draws in is called the content region. The rest of the window is drawn by a collection of system software routines for creating and manipulating windows known as the Window Manager. The parts of the window that the Window Manager draws (using a window definition) make up the window frame, which usually surrounds the rest of the window. In a standard document window, for example, the frame consists of a title bar and an outline of the window.

A window always has at two regions: a content region, which is the area where an application displays information, and a structure region, which is the entire window (the content region plus the window frame). The content region may also contain a size box and scroll bars. A window usually has additional regions including a close box (go-away region) and a zoom box. Clicking in the close box closes the window. Clicking in the zoom box causes the window to grow so that it fills the entire screen or grows as much as necessary to display all the information it contains. On a Macintosh system, the close box and the zoom box are standard interactive user-interface elements, or "gadgets", and are located in the title bar portion of a window, the close box in the upper left corner and the zoom box in the upper right corner. Different systems may provide sets of gadgets in a window title bar different from the set in a Macintosh window.

Many application programs written for the Macintosh use only standard, system-defined windows having only the standard gadgets (close box and zoom box) in the title bar. Applications are not limited to using standard windows, however, but are free to define their own windows, having "custom" gadgets particular to that application if desired, using custom window definitions, or WDEFs. A WDEF is the code responsible for drawing window frames and for telling the Window Manager what part of a window a particular point is in. Custom gadgets have not been specifically supported by the Macintosh system software. Furthermore, no system is known to allow application to add custom gadgets on a per-window basis. Custom gadgets have therefore been implemented by working around system software using multiple software "patches" in a way that is not only cumbersome but also inflexible.

A custom WDEF must perform two different functions with respect to custom gadgets, drawing (i.e., providing for actual rendering the custom gadget on the computer screen) and hit-testing (i.e., determining when the custom gadget has been clicked). Because application developers wanting to add a custom gadget typically do not want to completely change a window's appearance from that of a standard window but only want to augment its appearance, they effectively use custom WDEFs to patch the WDEFs provided by the system. The custom WDEFs do their augmentation before and/or after calling through to a system-provided WDEF.

The two behaviors such custom WDEFs must alter are the drawing behavior and the hit-testing behavior. As illustrated in FIG. 1, when called to draw a window frame, the custom WDEF will call the system WDEF to draw the window and will then draw the custom gadget on top of the window that was just drawn. A significant drawback to this approach is that it requires developers to make assumptions about the geometry and appearance of the system's windows in order to attach custom gadgets. If the geometry or appearance of the window provided by the system should change, the application's custom gadget will be drawn incorrectly in relation to the other screen elements of the window. As illustrated in FIG. 2, when hit-testing, the process works in the opposite direction. The custom WDEF will first see if the input point is in the custom gadget. If so, the custom WDEF will return without calling the system WDEF. If not, the custom WDEF will call through to the system WDEF to find where in the window the point lies. Hit-testing therefore requires a front-end code patch, while drawing requires a rear-end code patch.

The foregoing mechanism is unreliable, since it depends on system behavior not within the developer's control, cumbersome and inflexible. What is needed, then, is a mechanism that explicitly supports custom gadgets (user-interaction elements) in an efficient way that requires a minimum of application involvement.

SUMMARY OF THE INVENTION

The present invention, generally speaking, provides, at a system software level, explicit support for custom gadgets in a manager that is essentially application-transparent. Specific support is provided for the addition of one custom gadget per window. The custom gadget is identified by a specific numeric code in the same manner as the close and zoom boxes. An application simply tells the system software what the custom gadget for a particular window should look like. The code responsible for drawing that window's frame then knows where to find the image of the custom gadget and will render it appropriately. When a user clicks in the custom gadget, the application gets the event and calls on the system software to identify the event. The system software identifies the event to the application by means of the numeric code associated with the custom gadget. More particularly, in accordance with one embodiment of the invention, a custom interactive user-interface element is provided in a title bar of a window of an application program in a graphical, event-driven computer system having a computer display. The custom interactive user-interface element is provided by storing information, referring to an icon stored as part of said application program and used to visually represent the custom interactive user-interface element, in a location accessible to a Window Manager. The Window Manager then draws on the computer display a frame of the window including the icon used to visually represent the custom interactive user-interface element.

BRIEF DESCRIPTION OF THE DRAWINGS

The present invention may be further understood from the following description in conjunction with the appended drawing. In the drawing.

DETAILED DESCRIPTION OF THE PREFERRED EMBODIMENTS

The present invention will be described in detail in relation to the Macintosh computer system and its system software. It should be understood, however, that the invention is broadly applicable to graphical, event-driven computer systems of all types as well as to different graphical user interfaces including, for example, X Windows, AUX, Microsoft Windows, MOTIF, etc.

The invention provides new functionality in system software that removes the need for applications to make assumptions regarding the appearance or geometry of a window and also removes the need to "work around" the system using assumptions about how the operating system works. This functionality insures the smooth integration of a custom gadget into any system-provided window, allowing the appearance of system-provided windows to change without affecting applications that use custom gadgets. In the Macintosh system, this functionality is provided in the Window Manager. In other systems, the same functionality may be provided within whatever code module or modules that provide routines for creating and manipulating windows.

In accordance with a preferred embodiment of the present invention, an application program interface (API) call SetWindowProperty is used to "attach" a given custom gadget to a window. In the Macintosh system, properties are tagged data that can be attached to various elements in the Macintosh Toolbox.

The syntax of SetWindowProperty is
  SetWindowProperty          (theWindow,
    kCustomGadgetProperty, &gadgetImage, sizeof (Handle));
where the listed parameters have the following meanings;

| | |
|---|---|
| kCustomGadgetProperty | A tag to identify a custom gadget appearance property. |
| gadgetImage | An icon suite in which the appearance of the gadget is defined. |
| theWindow | Identifies the window to which the gadget is to be added. |

Figure 1:
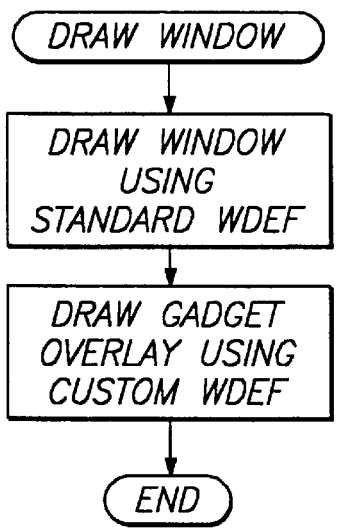
FIG. 1 is a flow diagram showing a mechanism for drawing custom user-interface elements in accordance with the prior art.
Figure 3:
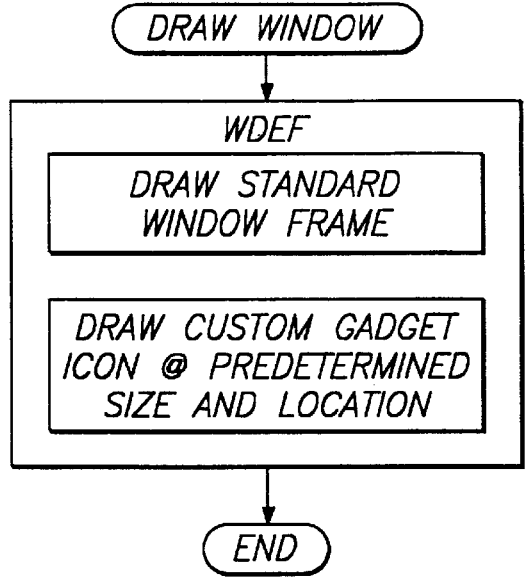
FIG. 3 is a flow diagram showing a mechanism for drawing custom user-interface elements in accordance with the present invention.
Figure 2:
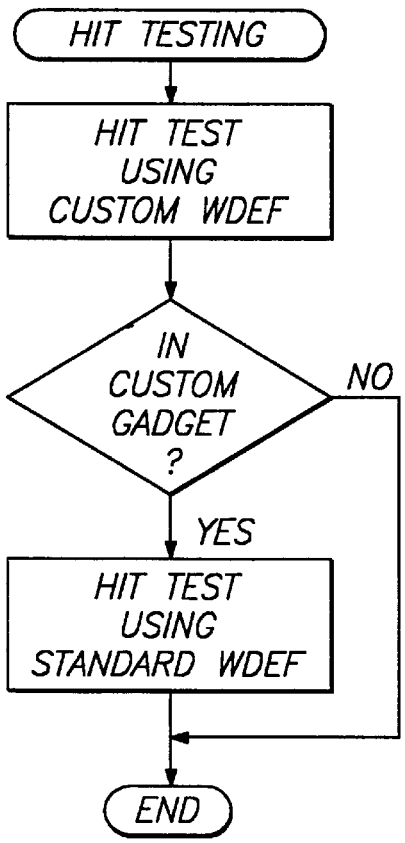
FIG. 2 is a flow diagram showing a mechanism for hit-testing windows including custom user-interface elements in accordance with the prior art.

Using the foregoing information, a system-supplied WDEF is readily able to draw the window including the custom gadget. As shown in FIG. 3, the WDEF, besides drawing the standard window frame, simply draws the custom gadget icon specified by the application at a predetermined size and location. Since the WDEF already posses information fully describing the window frame, there is no danger of improper placement of the custom gadget as in the prior art.

Identification of a mouse click in the custom gadget is seamlessly integrated into a single hit-testing procedure. When a user clicks the mouse button, the application calls the Window Manager (using a FindWindow system call) to determine the window in which the user clicked FindWindow also tells the application where in the particular window the user clicked. Specific codes are defined for each location in a window. A unique code identifies the custom gadget, as shown below:

```
//FindWindow return codes
enum
{
    inDesk =            0
    inMenuBar =         1
    inSysWindow =       2
    inContent =         3
    inDrag =            4
    inGrow =            5
    inGoAway =          6
    ifZoomIn =          7
    ifZoomOut =         8
    inCustomGadget =    9
    inTitleIcon =       10
};
```

Figure 4:
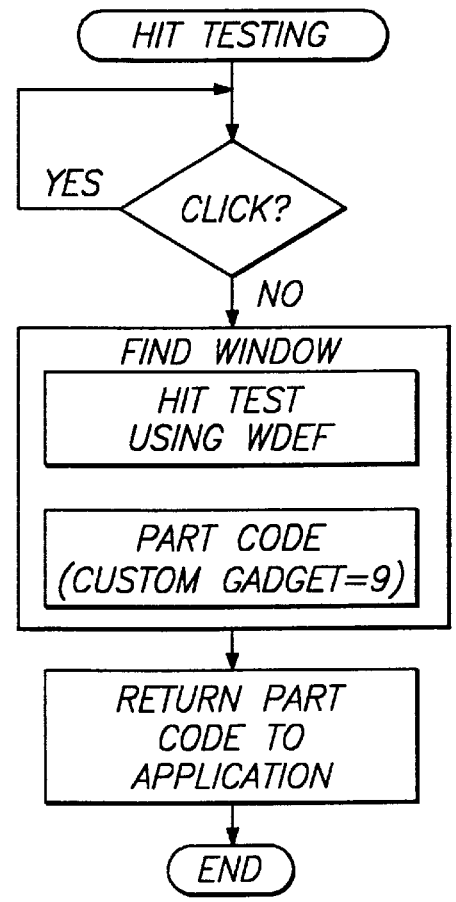
FIG. 4 is a flow diagram showing a mechanism for hit-testing windows including custom user-interface elements in accordance with the present invention.

Using the foregoing part codes, FindWindow identifies to the application which window and whichever part of that window, including the custom gadget, the click may have been in. As shown in FIG. 4, hit-testing is therefore greatly simplified. Once a click has been detected and communicated to the application, the application simply calls FindWindow, which performs hit-testing according to the normal WDEF and returns a part code to the application.

Using the arrangement described, explicit support is provided, at a system software level, for custom gadgets in a manner that is essentially application-transparent.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. For use in a graphical, event-driven computer system having a computer display and a graphical user interface, a method of providing a customer interactive user-interface element in a frame of a window of an application program, in addition to system-defined elements provided in each window displayed by said computer system, said method comprising the steps of:

storing information referring to an icon, stored as part of said application program and used to visually represent the custom interactive user-interface element, in a location accessible to a window manager; and the window manager drawing on the computer display a frame of the window including drawing, at a size and location determined by the window manager, the icon used to visually represent the custom interactive user-interface element;

wherein clicking on the custom interface user-interface element causes the application to perform a function that is in addition to functions defined as part of the graphical user interface.

2. The method of claim 1, comprising the further steps of:

defining a unique part code, designating a custom interactive user-interface element, within a system resource responsible for, using the window definition system resource, testing to determine in which window and where within that window a user click may have occurred;

receiving from the application program a call to the system resource responsible for said testing and in response thereto invoking the system resource responsible for said testing; and returning to the application program a part code designating the custom interactive user-interface element if the click occurred within a region occupied by the icon used to visually represent the custom interface user-interface element.

3. The method of claim 2, wherein the custom user interface element is displayed in a frame of the window.

4. The method of claim 2, wherein system software is responsive to a system call of a predetermined format to add said custom graphical user interface element to said window.

5. The method of claim 4, wherein said system call is a generic call used to set window properties and takes as parameters a window identifier and a string constant indicating that a custom user interface element is to be added to the window.

6. The method of claim 5, wherein said call takes as a further parameter a pointer to at least one icon representing the custom user interface control.

7. A computer system having a graphical user interface and having system software that provides for the addition of a custom user interface control to an application program, comprising:

a CPU subsystem; and coupled to the CPU subsystem, a storage subsystem storing said system software, said system software including program instructions for, in response to a system call of a predetermined format from said application program:

displaying said custom user interface control as part of a display window belonging to the application program, at a size and location determined by the system software; and notifying the application of a user event in which the custom user interface control is activated.

8. The apparatus of claim 7, wherein the custom user interface control is displayed in a frame of the window.

9. The apparatus of claim 8, wherein said system call is a generic call used to set window properties and takes as parameters a window identifier and a string constant indicating that a custom user interface control is to be added to the window.

10. The apparatus of claim 9, wherein said call takes as a further parameter a pointer to at least one icon representing the custom user interface control.

11. The apparatus of claim 7, wherein notifying the user comprises returning to the application a code associated with the customer user interface control.

12. A machine readable medium storing system software computer program instructions providing for the addition of a custom graphical user interface control to an application program, including instructions for:

displaying said custom user interface control as part of a display window belonging to the application program, at a size and location determined by the system software; and notifying the application of a user event in which the custom user interface control is activated.

13. The article of claim 12, wherein the custom user interface control is displayed in a frame of the window.

14. The article of claim 12, wherein said system software is responsive to a system call of a predetermined format to add said custom graphical user interface control to said window.

15. The article of claim 14, wherein said system call is a generic call used to set window properties and takes as parameters a window identifier and a string constant indicating that a custom user interface control is to be added to the window.

16. The article of claim 15, wherein said call takes as a further parameter a pointer to at least one icon representing the custom user interface control.

17. The article of claim 12, wherein notifying the user comprises returning to the application a code associated with the customer user interface control.

* * * * *